United States Patent
Hao

(10) Patent No.: US 10,353,249 B2
(45) Date of Patent: Jul. 16, 2019

(54) THIN FILM TRANSISTOR SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 197 days.

(21) Appl. No.: 15/117,199

(22) PCT Filed: Jul. 5, 2016

(86) PCT No.: PCT/CN2016/088497
§ 371 (c)(1),
(2) Date: Aug. 6, 2016

(87) PCT Pub. No.: WO2017/206264
PCT Pub. Date: Dec. 7, 2017

(65) Prior Publication Data
US 2018/0196317 A1    Jul. 12, 2018

(30) Foreign Application Priority Data
Jun. 1, 2016   (CN) .......................... 2016 1 0379396

(51) Int. Cl.
  *G02F 1/1335*  (2006.01)
  *G02F 1/1343*  (2006.01)
(Continued)

(52) U.S. Cl.
  CPC ...... *G02F 1/134309* (2013.01); *G02F 1/1368* (2013.01); *G02F 1/133514* (2013.01);
(Continued)

(58) Field of Classification Search
  CPC ......... G02F 1/134309; G02F 1/133514; G02F 1/134363
  See application file for complete search history.

(56) References Cited

U.S. PATENT DOCUMENTS 5,283,205 A    2/1994  Sakamoto et al.
2002/0024626 A1 *  2/2002  Lee ................... G02F 1/134363
                                                    349/141
(Continued)

FOREIGN PATENT DOCUMENTS

CN    1567070 A    1/2005
CN   101458443 A   6/2009
(Continued)

*Primary Examiner* — Lucy P Chien
(74) *Attorney, Agent, or Firm* — Andrew C. Cheng

(57) ABSTRACT

The present invention demonstrates a kind of thin film transistor and a liquid crystal display panel. The thin film transistor substrate includes a substrate and the stacking structure of the first common electrode and the pixel electrode which are isolated from each other. A hollow structure is located in a position where the pixel electrode and the first common electrode overlap and shape of the hollow structure is related to the first common electrode It could increase the control of the electric field of the liquid crystal, decrease the width of the dark line of the pixel, improve the performance and transmittance of the liquid crystal, avoid the through via, and prevent the short-circuited problem.

16 Claims, 3 Drawing Sheets

(51) Int. Cl.
  *G02F 1/1362* (2006.01)
  *G02F 1/1368* (2006.01)

(52) U.S. Cl.
  CPC .. *G02F 1/134363* (2013.01); *G02F 1/136227* (2013.01); *G02F 1/136286* (2013.01); *G02F 2001/134318* (2013.01); *G02F 2201/121* (2013.01)

(56) References Cited

U.S. PATENT DOCUMENTS

| | | | | |
|---|---|---|---|---|
| 2003/0071952 | A1* | 4/2003 | Yoshida | G02F 1/134363 349/141 |
| 2003/0179173 | A1* | 9/2003 | Koyama | G09G 3/3648 345/92 |
| 2005/0083471 | A1* | 4/2005 | Ono | G02F 1/133345 349/143 |
| 2005/0134780 | A1 | 6/2005 | Hsieh et al. | |
| 2015/0070646 | A1* | 3/2015 | Kim | C09K 19/3098 349/178 |
| 2016/0291417 | A1* | 10/2016 | Choi | G02F 1/134363 |
| 2017/0045765 | A1* | 2/2017 | Fujisawa | C09K 19/544 |
| 2017/0133402 | A1 | 5/2017 | Ning et al. | |

FOREIGN PATENT DOCUMENTS

| | | |
|---|---|---|
| CN | 201974610 U | 9/2011 |
| CN | 202177761 U | 3/2012 |
| CN | 103488004 A | 1/2014 |
| CN | 104503203 A | 4/2015 |
| CN | 104865789 A | 8/2015 |
| CN | 105487316 A | 4/2016 |
| JP | 2000238447 A | 9/2000 |
| JP | 2016053194 A | 4/2016 |

\* cited by examiner

THIN FILM TRANSISTOR SUBSTRATE AND LIQUID CRYSTAL DISPLAY PANEL

FIELD OF THE INVENTION

The present invention relates to liquid crystal display field, and more particularly, to a thin film transistor substrate and the liquid crystal display panel.

BACKGROUND OF THE INVENTION

With the advantages of high quality display, cheap, easily portable, liquid crystal display, is usually used in the mobile communications equipment, pc, TV . . . etc. Currently the liquid crystal display consists of an upper substrate, a down substrate, and a middle crystal layer, the substrates consist of the glass and the electrode. If there are electrodes both on the upper substrate and the down substrate, the vertical electric field type display is formed, for example, TN (Twist Nematic) type, VA (Vertical Alignment) type, and MVA (Multi-domain Vertical Alignment) type for the wide viewing angle. Another type is different from the describe above, the electrode is on one side of the substrate to form the horizontal electric field type display, for example, IPS (In-plane-switching) type, FFS (Fringe Field Switching) type . . . etc.

VA type thin film transistor display is used to the large size panel, for example, liquid crystal TV . . . etc., because of the high aperture ratio, the high resolution, the wide viewing angle . . . etc. But in the small size and high resolution panel, the traditional designed pixel of crystal panel, the VA type thin film transistor display is not widespread.

Referring to FIG. 1 and FIG. 2 demonstrates the main operating principle. FIG. 1 illustrates the current pixel structure of VA type display. FIG. 2 is the A-A cross section view of FIG. 1. The upper substrate is the common electrode substrate, and the down substrate is the pixel electrode arranged on the substrate, and the pixel electrode layout is made on the ITO substrate. To achieve the purpose of display, the curved edge electric field is formed by the different electrode pattern of the upper substrate and the down substrate at the edge of the pixel, and the edge electric field controls the liquid crystal direction of the panel. Comparing to the traditional MVA type, this kind of technology reduces the expensive process of protrusion structure, and has very high contrast and viewing angle symmetry.

The Problem of the Pixel Structure:

The crossover shape of the ITO common electrode between the pixel electrodes is patterned from the same ITO layer. Because of the limitation of the process, the width between the pixel electrode and the common electrode, and the width of the common electrode itself must keep the same width. The width brings the dark line from the pixels, and reduces the liquid crystal performance and transmittance.

The pixel electrode and the common electrode in the same ITO layer and the same pixel easily have the short-circuited problem and the defect of the display.

The through via is added at the external of the pixel to connect the common electrode and the external common electrode wire.

SUMMARY OF THE INVENTION

The present invention provides a kind of thin film transistor substrate and a liquid crystal display panel to solve the technical problem. It could increase the liquid crystal control of electric field, decrease the width of the dark line of the pixel, improve the performance and transmittance of the liquid crystal, avoid the through via and prevent the short-circuited problem.

To solve the problem, the present invention provides a kind of thin film transistor substrate. The thin film transistor substrate includes a substrate and a first common electrode and a pixel electrode are laminated on the substrate and isolated from each other wherein a hollow structure is located in a position where the pixel electrode and the first common electrode overlap and shape of the hollow structure is related to the first common electrode.

The first common electrode comprises first electrode branch and a second electrode branch being crossing over the first electrode branch, and the angle between the first electrode branch and the second electrode branch is from 0 degree to 180 degrees.

The width of the window is less than or equal to the width of the first common electrode.

To solve the problem, the present invention provides a kind of thin film transistor substrate. The thin film transistor substrate comprises a substrate and a first common electrode and a pixel electrode are laminated on the substrate and isolated from each other wherein a hollow structure is located in a position where the pixel electrode and the first common electrode overlap and shape of the hollow structure is related to the first common electrode.

The first common electrode comprises a first electrode branch and a second electrode branch being crossing over the first electrode branch, and an angle between the first electrode branch and the second electrode branch is from 0 degree to 180 degrees.

The angle between the first electrode branch and the second branch is 90 degrees.

The width of the window is less than or equal to the width of the first common electrode.

The first common electrode and the pixel electrode is used for providing an edge electric field for vertical alignment.

The thin film transistor substrate comprises the scan line and the data line which intersected each other and isolated from each other, and the first common electrode is disposed in a same layer as one of the scan line or the data line.

A metal layer of the first common electrode and one of the scan line or the data line are formed by one step of a patterning process.

The TFT substrate further comprises the thin film transistor disposed at the intersection between the scan line and the data line, the thin film transistor includes a gate, a gate insulating layer, a semiconductor layer, a source, a drain and an interlayer insulating layer. The gate electrically connects to the scan lines, and the gate insulting layer is disposed above the gate of the thin film transistor. The semiconductor layer is disposed above the gate insulating layer, and the data line and the source and the drain are disposed at intervals on both sides of the semiconductor layer, and the data line and the source and the drain electrically connect to the semiconductor layer. The source and the data line are electrically connected. The interlayer insulting layer is disposed above the data line, the source, and the drain, and the interlayer insulating layer has the through via. The pixel electrode is disposed above the interlayer insulating layer and electrically connects to the drain by the through via.

To overcome the foregoing problem, a liquid crystal display panel according to the present invention includes a thin film transistor substrate. The thin film transistor substrate includes a substrate and a first common electrode and a pixel electrode are laminated on the substrate and isolated from each other wherein a hollow structure is located in a position where the pixel electrode and the first common electrode overlap and shape of the hollow structure is related to the first common electrode.

The first common electrode comprises a first electrode branch and a second electrode branch being crossing over the first electrode branch, and the angle between the first electrode branch and the second electrode branch is from 0 degree to 180 degrees.

The angle between the first electrode branch and the second branch is 90 degrees.

The width of the hollow structure is less than or equal to the width of the first common electrode.

The first common electrode and the pixel electrode the first common electrode and the common electrode is used for providing an edge electric field for vertical alignment.

The TFT substrate further comprising a scan line and a data line are intersected each other and isolated from each other on the substrate, wherein the first common electrode is disposed in a same layer as one of the scan line or the data line A metal layer of the first common electrode and one of the scan line or the data line are formed by one step of a patterning process.

The TFT substrate further comprises the thin film transistor disposed at the intersection between the scan line and the data line, the thin film transistor includes the gate, the gate insulating layer, the semiconductor layer, the source, the drain and the interlayer insulating layer. The gate electrically connects to the scan lines, and the gate insulting layer is disposed above the gate of the thin film transistor. The semiconductor layer is disposed above the gate insulating layer, and the data lines and the source and the drain are disposed at intervals on both sides of the semiconductor layer, and the data lines and the source and the drain electrically connects to the semiconductor layer. The source and the data line are electrically connected. The interlayer insulting layer is disposed above the data lines, the source, and the drain, and the interlayer insulating layer has the through via. The pixel electrode is disposed above the interlayer insulating layer and electrically connects to the drain by the through via.

Wherein the liquid crystal display includes CF (color filter) substrate at the opposite side of the thin film transistor substrate, and the second common electrode is disposed on the CF substrate.

The benefit of the present invention is different from the current technology. The invention is a thin film transistor substrate and a liquid crystal display panel. A hollow structure is located in a position where the pixel electrode and the first common electrode overlap. The hollow structure has the shape corresponding to the first common electrode. It could increase the liquid crystal control of the electric field, decrease the width of the dark line of the pixel, improve the performance and transmittance of the liquid crystal, avoid the through via, and prevent the short-circuited problem.

DETAIL DESCRIPTION OF THE PREFERRED EMBODIMENTS

Referring to the attached figures, the following embodiments are illustrated to exemplify certain embodiments that the present invention can applied to.

The liquid crystal display panel comprises a color filter substrate (CF substrate called for short), and a thin film transistor substrate (TFT substrate or Array substrate called for short), and a liquid crystal. The color filter substrate and the thin film transistor substrate are disposed on the opposite sides, and the liquid crystal is disposed between the color filter substrate and the thin film transistor substrate. The thin film transistor substrate usually comprises a glass substrate, a common electrode, a gate, a gate insulating layer, a semiconductor layer, an active semiconductor layer, an active electrode, a drain, a passivation layer, and a pixel electrode.

Figure 1:
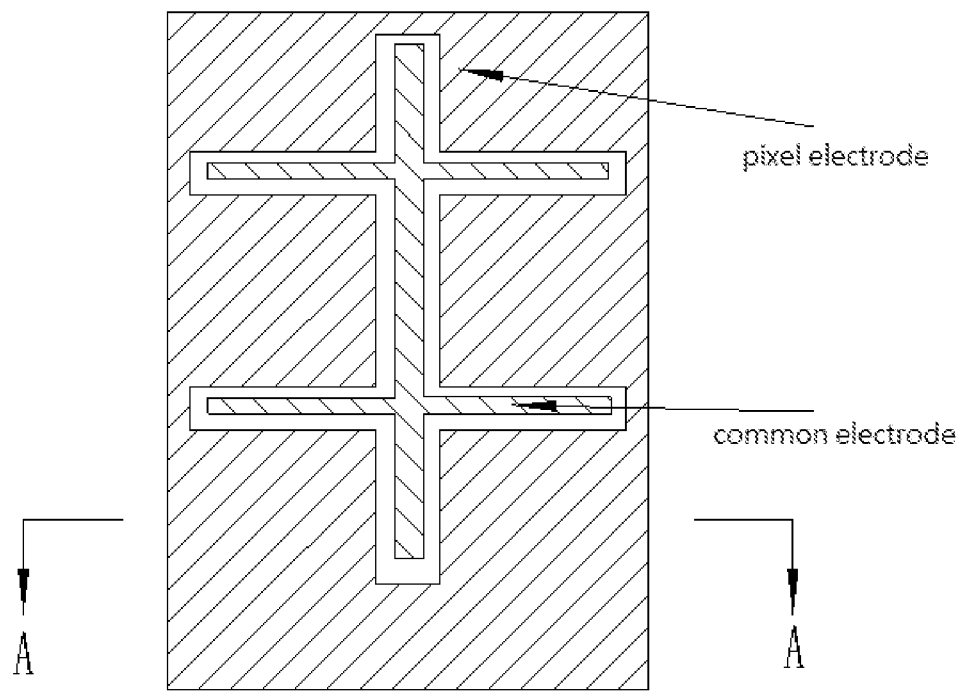
FIG. 1 demonstrates the current pixel structure of the VA type display.
Figure 2:
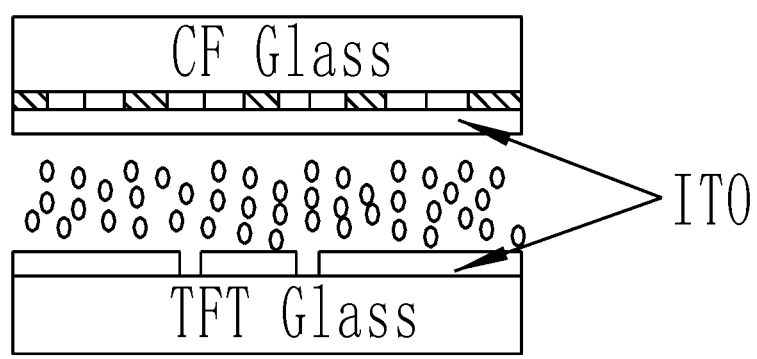
FIG. 2 shows an A-A cross section view of FIG. 1.
Figure 3:
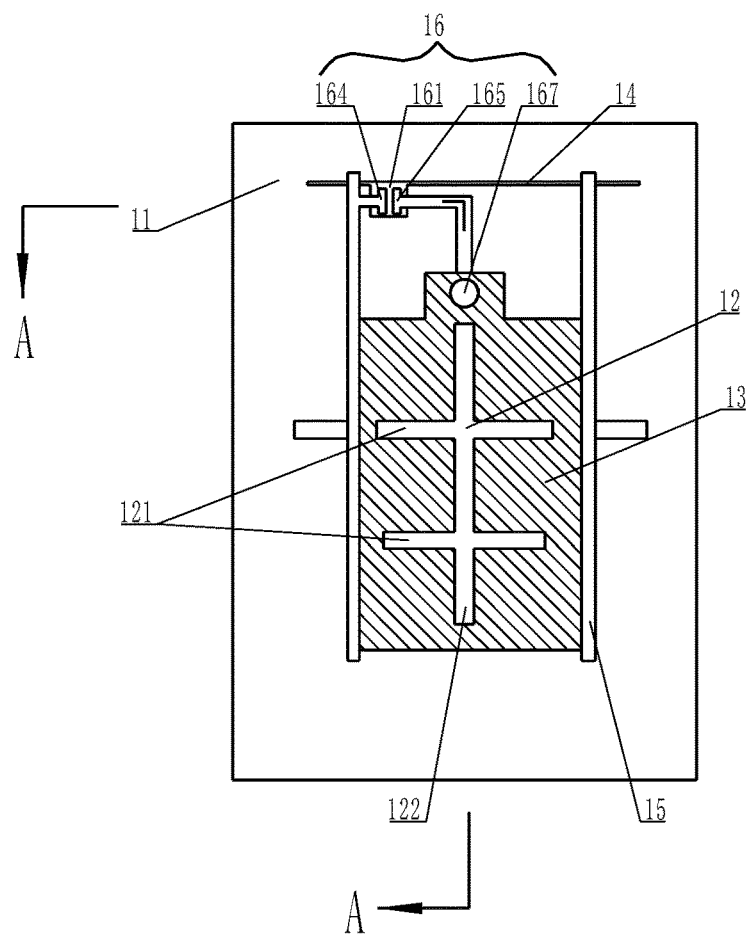
FIG. 3 illustrates the structure of the first embodiment of the thin film transistor substrate of the invention.
Figure 4:
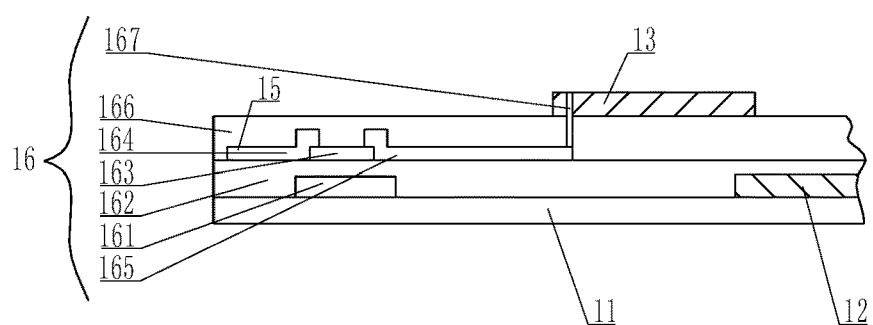
FIG. 4 shows a B-B cross section view of FIG. 3.

Referring to FIG. 3 demonstrates the thin film transistor substrate structure 1 of the first embodiment of the present invention, and referring to FIG. 4 is the B-B cross section view.

According to the embodiment, the thin film transistor substrate 1 includes a substrate 11 and a first common electrode and a pixel electrode are laminated on the substrate and isolated from each other. A hollow structure is located in a position where the pixel electrode and the first common electrode overlap and shape of the hollow structure is related to the first common electrode.

The scan line 14 and the data line 15 are intersected each other and isolated from each other on the substrate 11, wherein the first common electrode 12 and the scan line 14 (not shown in FIG. 4) or the data line 15 are in the same layer. Optionally, the first electrode 12 and the scan line 14 are disposed at the same layer.

Figure 5:
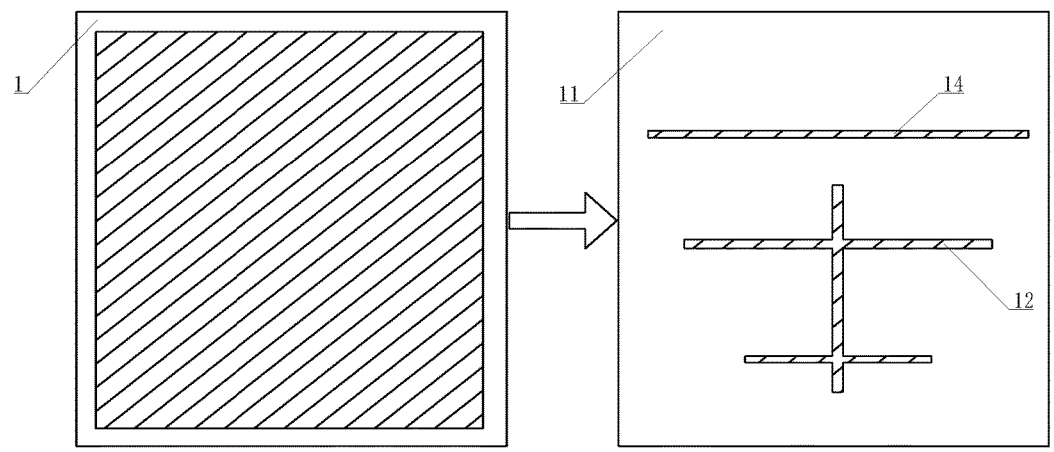
FIG. 5 is the patterning process diagram of the first common electrode.

Referring to FIG. 5 illustrates the patterning process diagram of the first common electrode 12, wherein the first common electrode 12 and the scan line 14 or the data line 15 are made by the same patterning process of the metal layer. Preferably, the first electrode 12 and the scan line 14 are made by the same metal layer patterning process.

The thin film transistor substrate 1 comprises the thin film transistor 16 disposed at the intersection between the scan line 14 and the data line 15. The thin film transistor 16 includes the gate 161, the gate insulating layer 162 (not shown in FIG. 3), the semiconductor layer 163 (not shown in FIG. 3), the source 164, the drain 165 and the interlayer insulating layer 166 (not shown in FIG. 3). The gate 161 electrically connects to the scan line 14, and the gate insulting layer 162 is disposed above the gate 161 of the thin film transistor 16. The semiconductor layer 163 is disposed above the gate insulating layer 162, and the data line 15 and the source 164 and the drain 165 are disposed at intervals on both sides of the semiconductor layer 163, and the data line 15 and the source 164 and the drain 165 electrically connect to the semiconductor layer 163. The source 164 and the data line 15 are electrically connected. The interlayer insulting layer 166 is disposed above the data line 15, the source 164, and the drain 165, and the interlayer insulating layer 166 has the through via 167. The pixel electrode 13 is disposed above the interlayer insulating layer 166 and electrically connects to the drain 165 by the through via 167.

According to the embodiment, the pixel electrode 11 and the first common electrode 12 are disposed at different layers, and the first common electrode 12 formed by the first metal layer is under the hollow structure of the pixel electrode 11. The first common electrode 12 and the upper layer of the hollow structure of the pixel electrode 11 form the edge electric field, the edge electric field enhances the electric field control ability of the liquid crystal, decreases the width of the dark line of the pixel, improve the performance and transmittance of the liquid crystal, avoid the through via connected the crossover shape of the ITO common electrode and the external common electrode, and prevent the problem of the electric connection between the common electrode and the wire of the external common electrode.

According to the first embodiment of the present TFT substrate invention, preferably the first common electrode 12 comprises the first electrode branch 121 and the second electrode branch 122 are cross over each, and the angle between the first electrode branch 121 and the second electrode branch 122 is from 0 degree to 180 degrees.

Preferably the angle between the first electrode branch 121 and the second branch 122 is 90 degrees.

Preferably, the width of the window is less than or equal to the width of the first common electrode 12.

The first common electrode 12 and the common electrode 13 is used for providing the edge electric field for vertical alignment.

Figure 6:
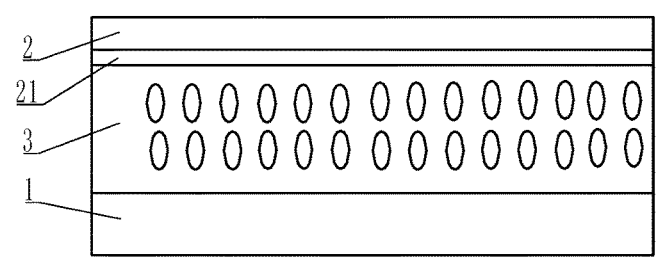
FIG. 6 is the structure diagram of the first embodiment of the liquid crystal display of the invention.

Referring to FIG. 6 demonstrates the first embodiment of the present invention of liquid crystal display panel. In order to solve the problem mentioned above, the present invention provides a kind of liquid crystal display panel, it comprises TFT substrate 1 which specific structure is described in the first embodiment of the thin film transistor substrate, and not discusses here. The liquid crystal display panel comprises the color filter substrate 2 at the opposite side of the thin film transistor substrate 1. The second common electrode 21 is installed on the color filter substrate 2, the liquid crystal 3 is disposed between the thin film transistor substrate 1 and the color filter substrate 2.

According to the embodiment, the pixel electrode 11 and the first common electrode 12 are disposed at different layers, and the first common electrode 12 formed from the first metal layer is under the hollow structure of pixel electrode 11. The first common electrode 12 and the upper layer of window of the pixel electrode 11 form the edge electric field, the edge electric field enhances the electric field control ability of the liquid crystal, decreases the width of the dark line of the pixel, improve the performance and transmittance of the liquid crystal, avoid the through via connected the crossover shape of the ITO common electrode and the external common electrode, and prevent the problem of the electric connection between the common electrode and the wire of the external common electrode.

The present invention is not limited to the forgoing embodiment, and a variety of modifications can be made without departing from the scope defined by the claims. Embodiments obtained by appropriately combining technical means disclosed in different embodiments are also included in the technical range of the present invention.

What is claimed is:

1. A thin film transistor substrate, comprising:
   a substrate;
   a first common electrode and a pixel electrode laminated on the substrate and isolated from each other, wherein a hollow structure is located in a position where the pixel electrode and the first common electrode overlap, and the hollow structure and the first common electrode have substantially the same pattern so that the first common electrode is exposed through the hollow structure; wherein the first common electrode comprises a first electrode branch and a second electrode branch being crossing over the first electrode branch, and an angle between the first electrode branch and the second electrode branch is from 0 degree to 180 degrees; the hollow structure comprises a first split and a second split being crossing over the first split; and the width of each of the first split and the second split is less than or equal to the width of each of the first electrode branch and the second electrode branch;
   a scan line and a data line intersected with each other, isolated from each other, and located on the substrate; and
   a thin film transistor located on the substrate and disposed at the intersection between the scan line and the data line; wherein the thin film transistor comprises: a gate, a gate insulating layer, a semiconductor layer, a source, a drain, and an interlayer insulating layer;
   wherein the first common electrode, the scan line, and the gate are located on the substrate and between the substrate and the gate insulating layer; the gate insulating layer covers the first common electrode, the scan line, and the gate; the semiconductor layer, the source, and the drain are located on the gate insulating layer and between the gate insulating layer and the interlayer insulating layer; the interlayer insulating layer covers the semiconductor layer, the source, and the drain; the pixel electrode is located on the interlayer insulating layer so that the interlayer insulating layer and the gate insulating layer are between the first common electrode and the pixel electrode.

2. A thin film transistor substrate, comprising: a substrate; a first common electrode and a pixel electrode laminated on the substrate and isolated from each other, wherein a hollow structure is located in a position wherein the pixel electrode and the first common electrode overlap, and the hollow structure and the first common electrode have substantially the same pattern so that the first common electrode is exposed through the hollow structure; a scan line and a data line intersected with each other, isolated from each other, and located on the substrate; a thin film transistor located on the substrate and disposed at the intersection between the scan line and the data line; wherein the thin film transistor comprises: a gate, a gate insulating layer, a semiconductor layer, a source, a drain, and an interlayer insulating layer; and wherein the first common electrode, the scan line, and the gate are located on the substrate and between the substrate and the gate insulating layer; the gate insulating layer covers the first common electrode, the scan line, and the gate; the semiconductor layer, the source, and the drain are located on the gate insulating layer and between the gate insulating layer and the interlayer insulating layer; the interlayer insulating layer covers the semiconductor layer, the source, and the drain; the pixel electrode is located on the interlayer insulating layer so that the interlayer insulating layer and the gate insulating layer are between the first common electrode and the pixel electrode, wherein the first common electrode comprises a first electrode branch and a second electrode branch being crossing over the first electrode branch, and an angle between the first electrode branch and the second electrode branch is from 0 degree to 180 degrees; the hollow structure comprises a first split corresponding to the first electrode branch and a second split being crossing over the first split and corresponding to the second electrode branch.

3. The thin film transistor substrate of claim 2, wherein the angle between the first electrode branch and the second electrode branch is 90 degrees; and the angle between the first split and the second split is 90 degrees.

4. The thin film transistor substrate of claim 2, wherein the width of each of the first split and the second split is less than or equal to the width of each of the first electrode branch and the second electrode branch.

5. The thin film transistor substrate of claim 2, wherein the first common electrode and the pixel electrode are used for providing an edge electric field for a vertical alignment.

6. The thin film transistor substrate of claim 2, further comprising a scan line and a data line intersected with each other, isolated from each other, and located on the substrate, wherein the first common electrode is disposed in a same layer as one of the scan line and the data line.

7. The thin film transistor substrate of claim 6, wherein the first common electrode and one of the scan line and the data line are formed by one step of a patterning a metal layer located on and in direct contact with a surface of the substrate.

8. The thin film transistor substrate of claim 5, further comprises a thin film transistor disposed at intersection between the scan line and the data line, wherein the thin film transistor comprises: a gate, a gate insulating layer, a semiconductor layer, a source, a drain and an interlayer insulating layer; the gate electrically connects to the scan line, and the gate insulting layer is disposed above the gate of the thin film transistor; the semiconductor layer is disposed above the gate insulating layer; and the data line and the source and the drain are disposed at intervals on both sides of the semiconductor layer; and the data line and the source and the drain electrically connect to the semiconductor layer; the source and the data line are electrically connected; the interlayer insulting layer is disposed above the data line, the source, and the drain; and the interlayer insulating layer has a through via, the pixel electrode is disposed above the interlayer insulating layer and electrically connects to the drain by the through via.

9. A liquid crystal display panel, comprising a thin film transistor substrate, wherein the thin film transistor substrate comprises: a substrate; a first common electrode and a pixel electrode are laminated on the substrate and isolated from each other, wherein a hollow structure is located in a position where the pixel electrode and the first common electrode overlap, and the hollow structure and the first common electrode have substantially the same pattern so that the first common electrode is exposed through the hollow structure, wherein the thin film transistor substrate further comprises: a scan line and a data line intersected with each other, isolated from each other, and located on the substrate; a thin film transistor located on the substrate and disposed at the intersection between the scan line and the data line; wherein the thin film transistor comprises: a gate, a gate insulating layer, a semiconductor layer, a source, a drain, and an interlayer insulating layer; and wherein the first common electrode, the scan line, and the gate are located on the substrate and between the substrate and the gate insulating layer; the gate insulating layer covers the first common electrode, the scan line, and the gate; the semiconductor layer, the source, and the drain are located on the gate insulating layer and between the gate insulating layer and the interlayer insulating layer; the interlayer insulating layer covers the semiconductor layer, the source, and the drain; the pixel electrode is located on the interlayer insulating layer so that the interlayer insulating layer and the gate insulating layer are between the first common electrode and the pixel electrode, wherein the first common electrode comprises a first electrode branch and a second electrode branch being crossing over the first electrode branch, and an angle between the first electrode branch and the second electrode branch is from 0 degree to 180 degrees; the hollow structure comprises a first split corresponding to the first electrode branch and a second split being crossing over the first split and corresponding to the second electrode branch.

10. The liquid crystal display panel of claim 9, wherein the angle between the first electrode branch and the second electrode branch is 90 degrees; and the angle between the first split and the second split is 90 degrees.

11. The liquid crystal display panel of claim 9, wherein the width of each of the first split and the second split is less than or equal to the width of each of the first electrode branch and the second electrode branch.

12. The liquid crystal display panel of claim 9, wherein the first common electrode and the pixel electrode are used for providing an edge electric field for a vertical alignment.

13. The liquid crystal display panel of claim 9, wherein the thin film transistor substrate further comprises a scan line and a data line intersected with each other, isolated from each other, and located on the substrate, wherein the first common electrode is disposed in a same layer as one of the scan line and the data line.

14. The liquid crystal display panel of claim 13, wherein the first common electrode and one of the scan line and the data line are formed by one step of a patterning a metal layer located on and in direct contact with a surface of the substrate.

15. The liquid crystal display panel of claim 12, wherein the thin film transistor substrate further comprises a thin film transistor disposed at the intersection between the scan line and the data line; the thin film transistor comprises: a gate, a gate insulating layer, a semiconductor layer, a source, a drain and an interlayer insulating layer; the gate electrically connects to the scan line, and the gate insulting layer is disposed above the gate of the thin film transistor; the semiconductor layer is disposed above the gate insulating layer; and the data line and the source and the drain are disposed at intervals on both sides of the semiconductor layer; and the data line and the source and the drain electrically connect to the semiconductor layer; the source and the data line are electrically connected; the interlayer insulting layer is disposed above the data line, the source, and the drain; and the interlayer insulating layer has a through via, the pixel electrode is disposed above the interlayer insulating layer and electrically connects to the drain by the through via.

16. The liquid crystal display panel of claim 9, substrate spaced apart from and facing to the thin film transistor substrate, and a second common electrode is disposed on the color filter substrate.

* * * * *